April 16, 1935.    J. G. BRUSH    1,998,117
DEVICE FOR MOLDING SLABS
Filed Feb. 8, 1934    10 Sheets-Sheet 1
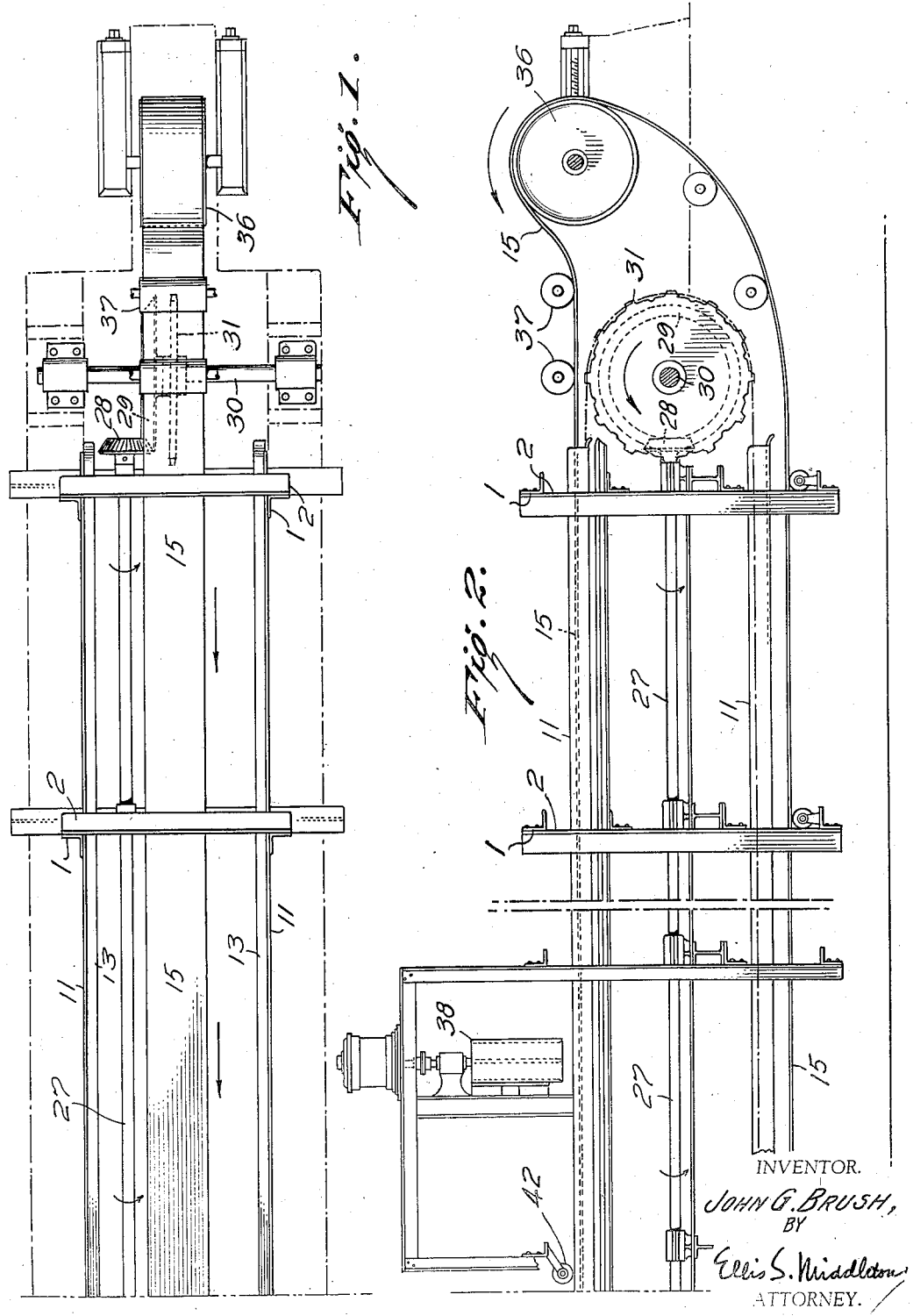
INVENTOR.
JOHN G. BRUSH,
BY
Ellis S. Middleton
ATTORNEY.

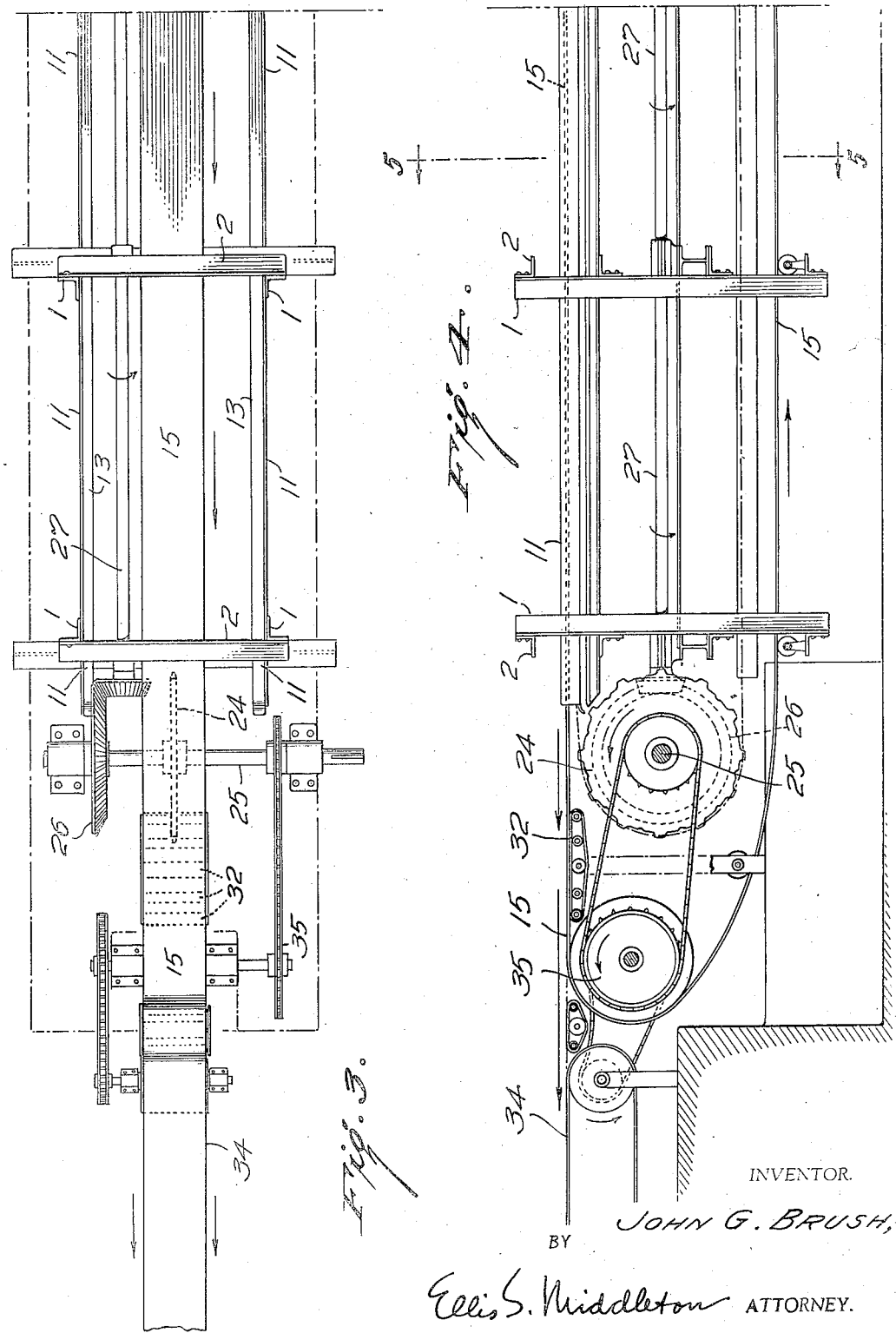

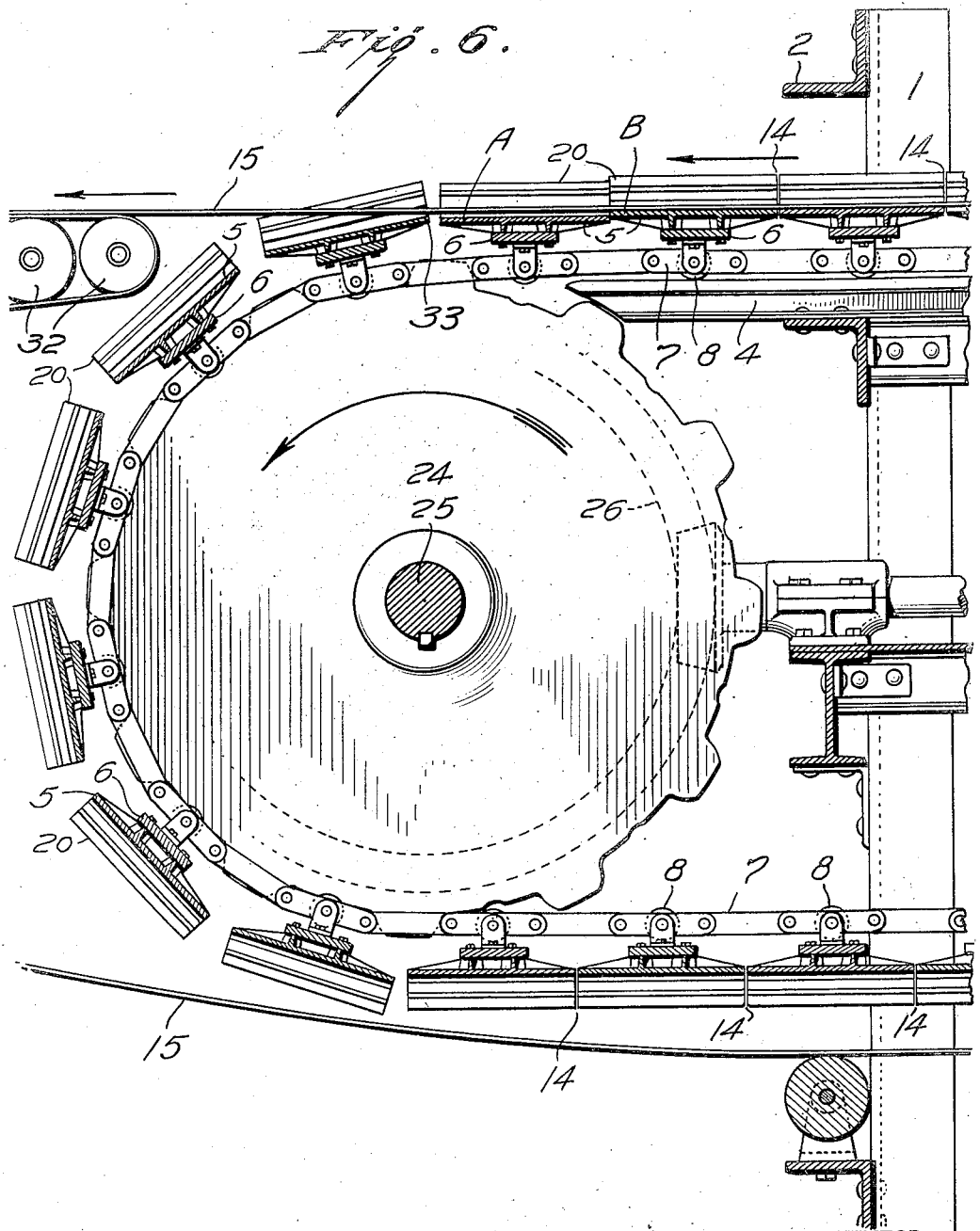

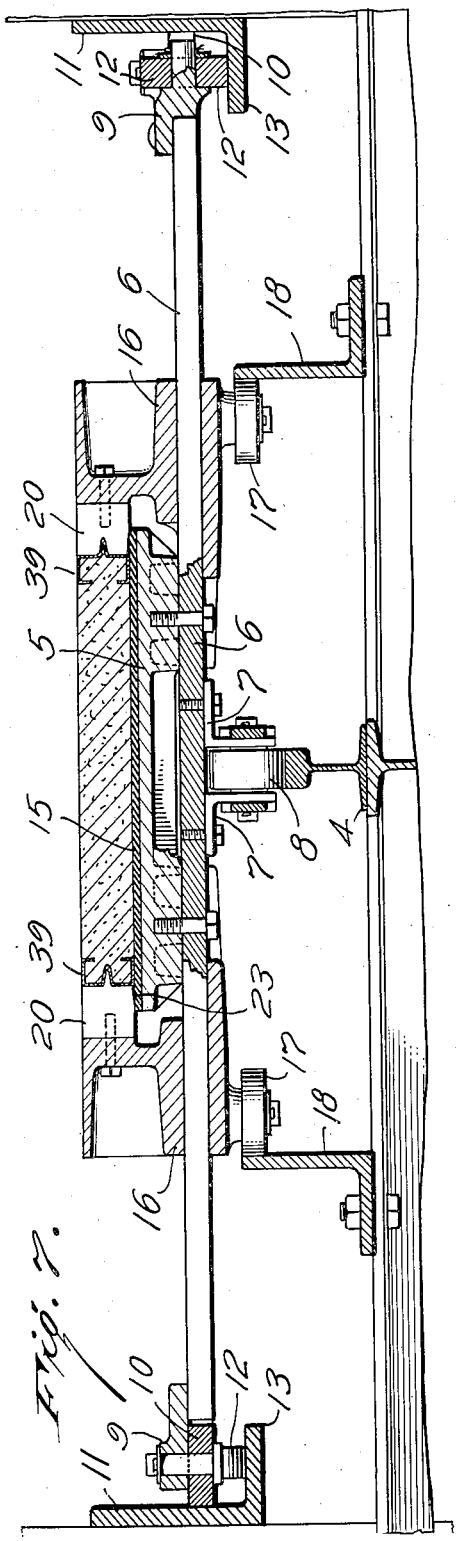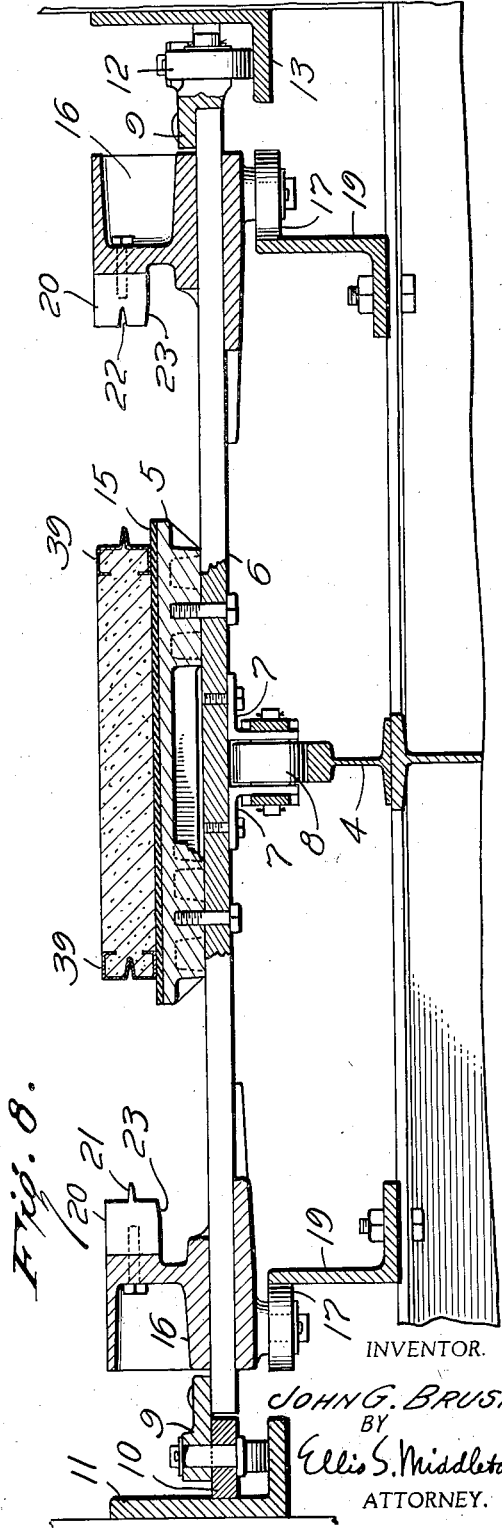

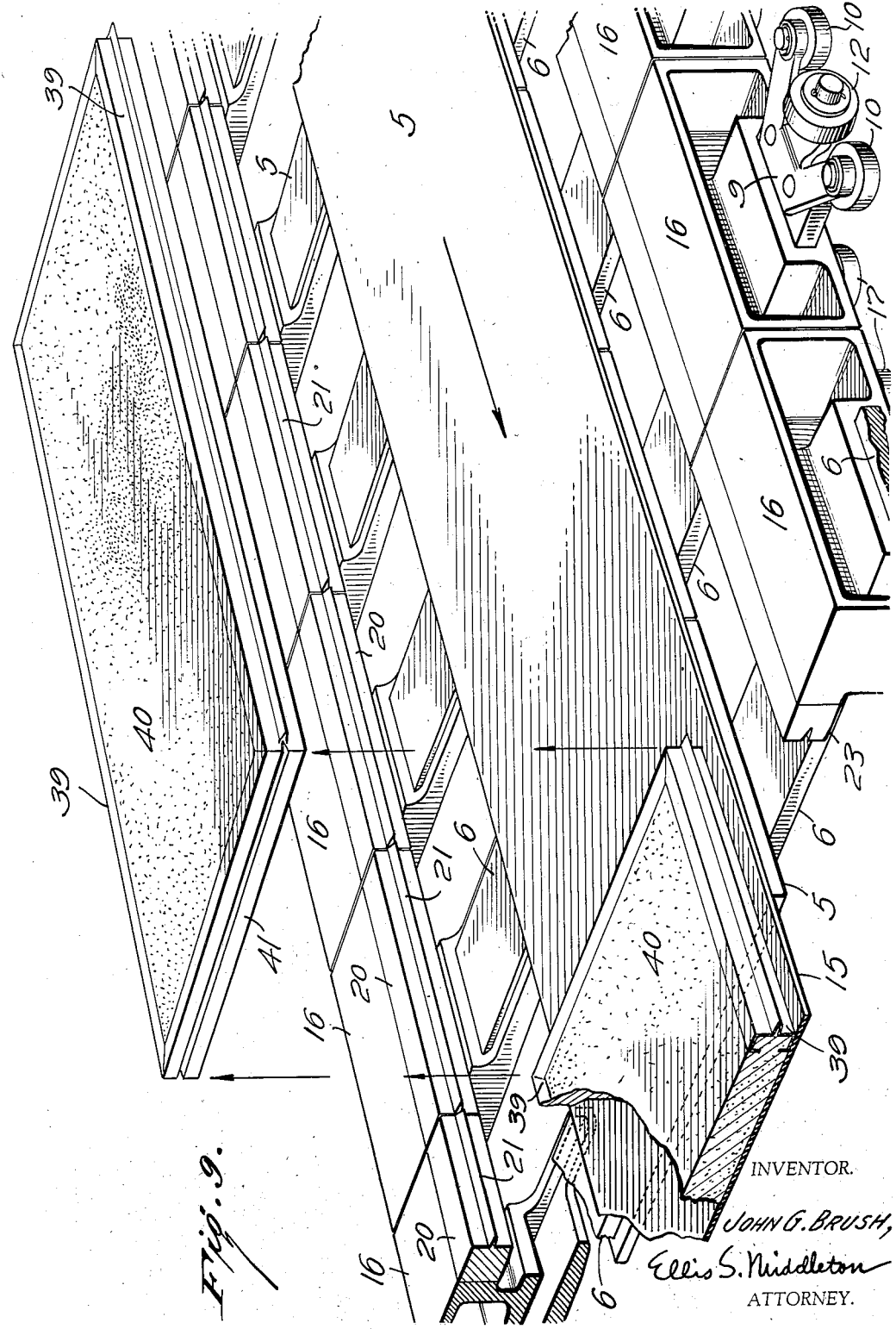

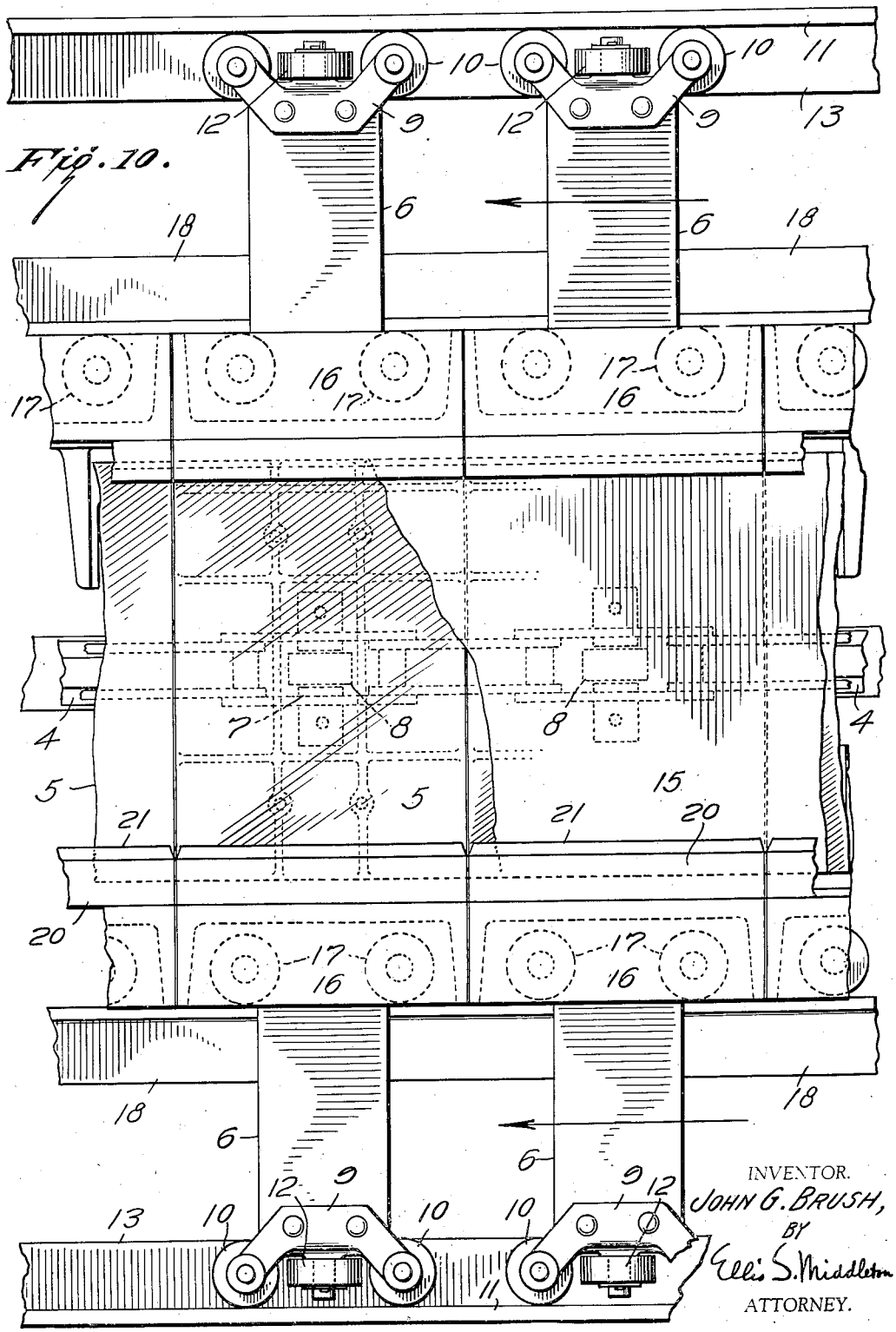

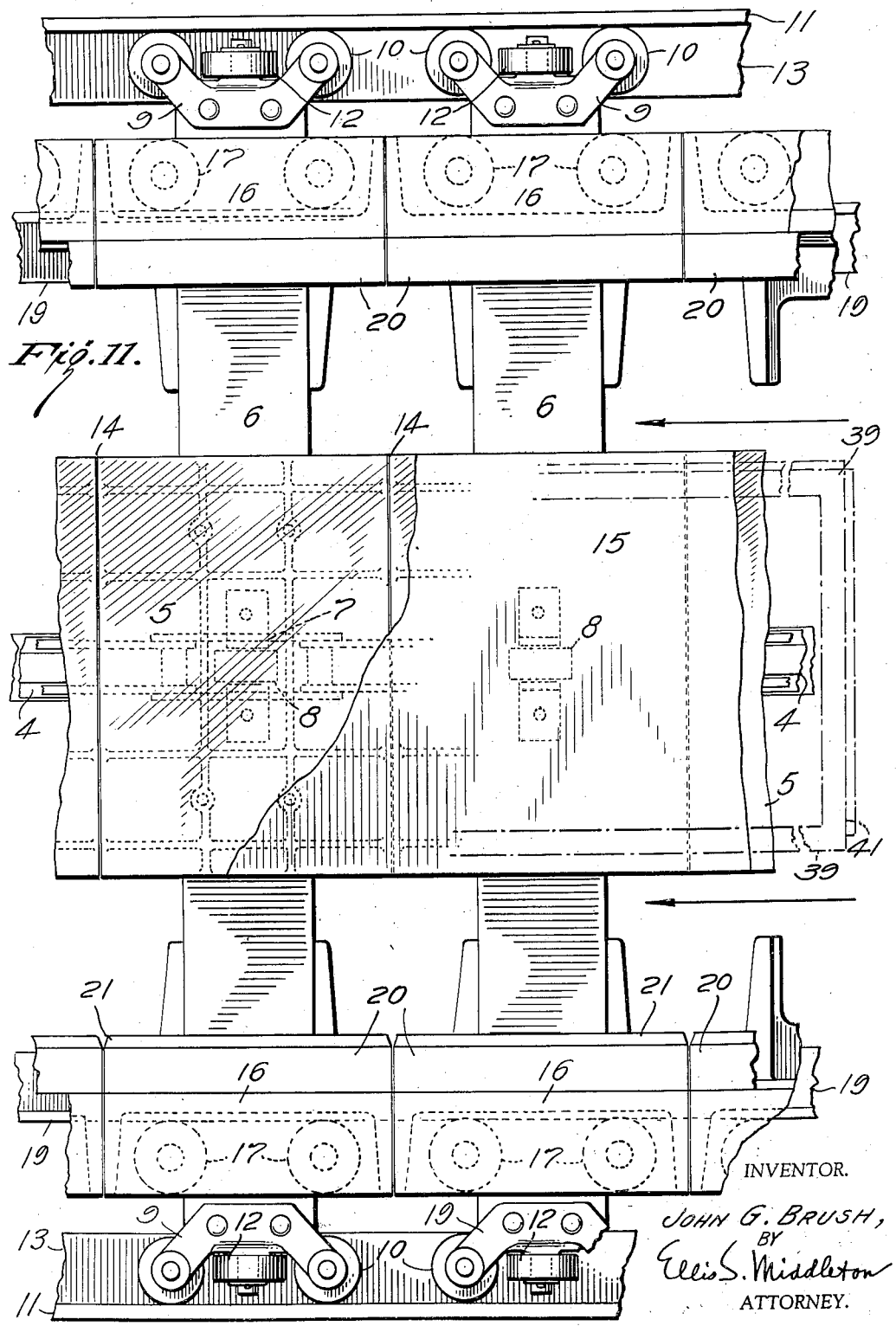

INVENTOR.
JOHN G. BRUSH,
BY
Ellis S. Middleton ATTORNEY.

Patented Apr. 16, 1935

1,998,117

UNITED STATES PATENT OFFICE 1,998,117

DEVICE FOR MOLDING SLABS

John G. Brush, Westfield, N. J., assignor, by mesne assignments, to American Cyanamid & Chemical Corporation, a corporation of Delaware Application February 8, 1934, Serial No. 710,237

13 Claims. (Cl. 25—42)

My present invention relates to a device for molding or casting slabs of gypsum or some similar cementitious material preferably though not necessarily continuously.

The principal object of the invention is the design of a machine which may be expeditiously used to cast slabs of the above character, quickly, cheaply and in a multiplicity of forms, with minimum adjustment.

Other objects and advantages will appear as the description proceeds.

The invention in one of its aspects only, contemplates a machine having a series of bed-plates carried on a conveying means, such as a chain or the like, and adapted to receive a flexible belt thereon serving as the bottom of a mold cavity and upon which the slabs are to be cast, with side mold heads movable toward and away from the flexible belt to form the sides of the mold cavities. The invention is primarily designed to cast slabs of a length many times their width and provided with side and/or end metal edge members and means are provided for seating or carrying these edge members so that the plastic material is received between them. In another aspect of the invention, and where such side and/or end metal edge members are used, the mold heads may be dispensed with and other means substituted to secure such edge elements in position to receive plastic material therebetween.

The invention, therefore, consists in the novel arrangement, combination and construction of parts more fully hereinafter described and shown in the accompanying drawings.

In the drawings—

Fig. 1 is a fragmentary top plan view of the in-put end of a machine constructed according to this invention.

Fig. 2 is a side elevation of that part of the machine shown in Fig. 1.

Fig. 3 is a fragmentary plan view of the out-put end of the machine, constructed according to this invention.

Fig. 4 is a side elevation of the machine of Fig. 3.

Fig. 6 is an enlarged side elevation, showing some of the details of construction of the out-put end of the machine of Fig. 3.

Fig. 7 is an enlarged sectional view similar to the top half of Fig. 5, showing the mold heads in closed position.

Fig. 8 is an enlarged sectional view similar to the view of Fig. 7, showing, however, the mold heads in opened or separated position.

Fig. 9 is a perspective view of an assembly near the out-put end of the machine, showing one form of completed slab.

Fig. 10 is a plan view of Fig. 5.

Fig. 11 is a fragmentary plan view similar to that of Fig. 10, except showing the mold heads in opened position.

Fig. 12 is a fragmentary plan view showing the use of end gates for separating cast slabs.

Fig. 13 is a sectional view along the line 13—13 of Fig. 12.

Fig. 14 is a sectional view along the line 14—14 of Fig. 12.

Fig. 15 is a perspective view of the end gate assembly.

Fig. 16 is a perspective of the supplemental block form part of the end gate assembly.

Figure 5:
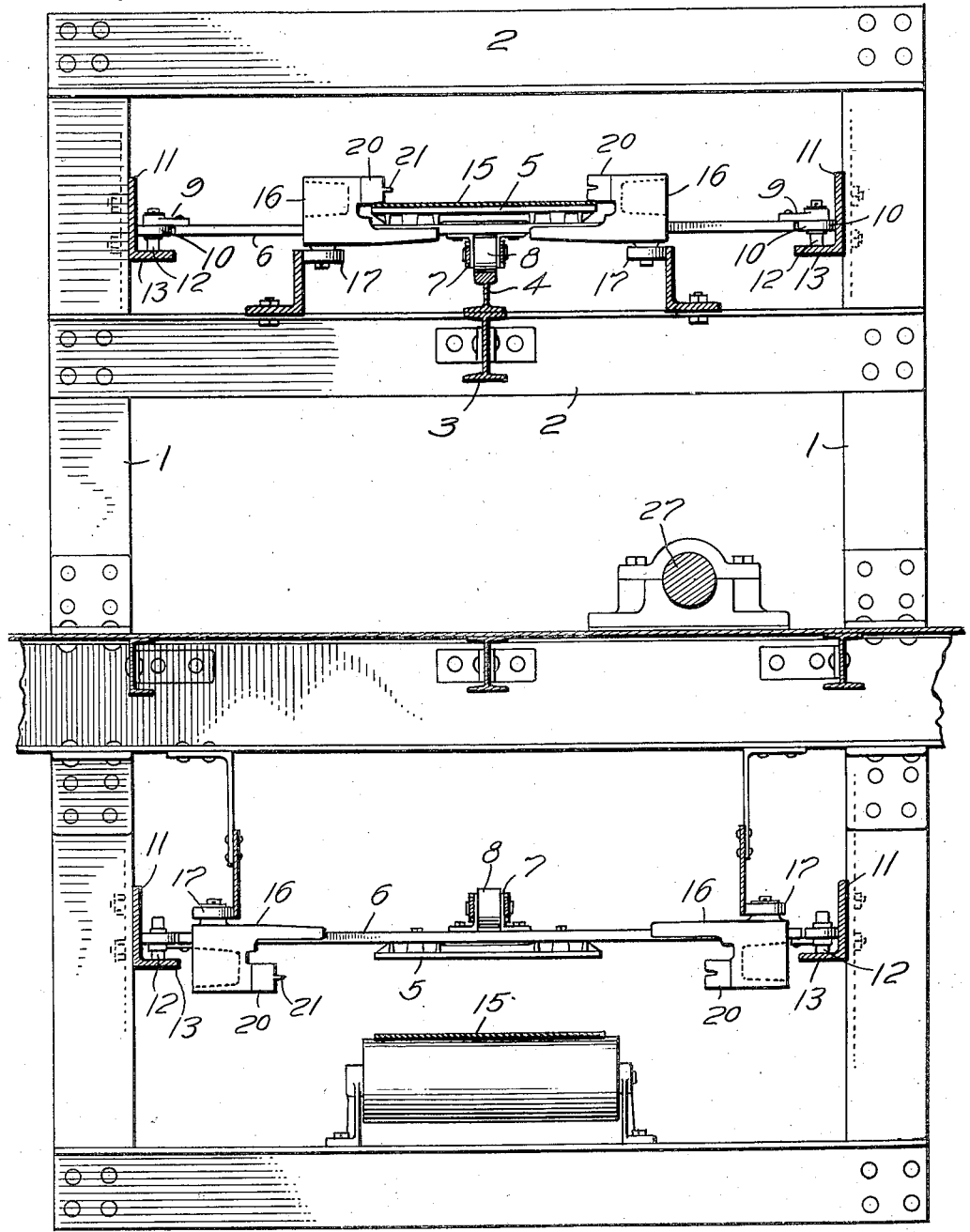
Fig. 5 is a sectional view along the line 5—5 of Fig. 4.

Referring now with particularity to the embodiments illustrated, but without particularly referring to the parts by reference character, the machine in one of its aspects comprises individual bed-plates secured to individual slide bars, which in turn are carried by links, the links passing over sprockets or pulleys at each end of the machine. The chains may include rollers supported upon suitable tracks to facilitate movement with a minimum amount of friction.

The machine frame is provided with tracks at each side thereof to receive supporting rollers on carriages on the ends of the slide bars.

Slidably mounted on each bar are two separated mold heads having roller mechanisms engageable with cam guides to cause movement of the heads toward and away from each other as the entire mechanism progresses under the action of power.

A flexible belt is adapted to lie upon the bed-plates to form a continuous smooth surface which is used as the bottom of the mold cavity, and the mold heads have mechanisms or portions adapted to overlie the belt. Where slabs are formed with metal edge members, these edge mechanisms are supported and held in the desired location either by the mold heads themselves or by suitable mechanism attached thereto, the entire assembly moving uniformly past a filling spout which delivers the plastic material to the belt and to the edge members thereon. Suitable screeding mechanism levels the plastic material to the desired thickness.

After the thus poured slab has progressed a distance sufficient to permit the plastic material to take a set, the rollers on the mold heads strike their cam guides and are separated from the thus set slab, which permits the slab to be removed. This removal mechanism may consist of an additional belt or rollers beyond the output end of the machine proper and moving at a rate slightly faster than the rate of travel of the belt supporting the slabs at the time of casting. This serves to pull the individual slabs away from each other for further disposition.

As the individual bed-plates pass over the power driven sprocket at the output end of the machine, suitable mechanism is provided for dropping the plates and their supports to a level lower than the normal run so that as these plates pass around the sprocket, the tipped-up edge thereof clears the belt which must in all events run as nearly horizontal as possible past the power driven sprocket.

As the bed-plates and their associated mechanism pass in an up-side-down position back to the in-put end of the machine, additional cam guides force the mold heads back into initial position. The bed-plates and their associated mechanism pass up around a sprocket which may be driven from the drive sprocket at the output end of the machine, where the frame side supporting rails again locate them in a position to receive more plastic material. At this point a flexible belt which has traveled completely outside of the bed-plates is returned to the bed-plates, and the operation is repeated.

The above operation is generally that designed for the casting of slabs where metal edge members are used on both the sides and the ends.

Where slabs having no metal members on the ends are cast, the operation above is only slightly modified in that separable end gates are placed in position between certain mold heads, determined by the length of the slab to be cast and these end gates are removed after the finished slab has been pulled away from the main run by the faster driven belt, and such end gates then returned to position at the in-put end of the machine.

Where the metal edged members are initially supplied to the machine in the form of a rigid frame, that is, not separate pieces, the elaborate mold head mechanism is unnecessary but may be replaced by a much simpler mechanism designed merely to clamp or secure the rigid frames to the belt. This clamping action is performed automatically by means of certain toggles operating triggers, as is likewise their release from operating position in order to remove the slab.

Referring now with particularity to one of the embodiments illustrated, frame standards are shown at 1 having horizontal cross pieces 2 to support the entire mechanism.

Suitably carried by one cross piece 2 is a beam 3 carrying rail 4, which may serve as the principal support for the series of bed-plates.

These bed-plates are shown at 5, secured to individual slide bars 6 which are in turn carried by links 7 having rollers 8 riding upon the supporting rail 4. The ends of the slide bars 6 are provided with carriages 9, having rollers 10 mounted thereon which engage the vertical portion 11 of the slide bar track, and other rollers 12 supported upon the horizontal portion 13 of the slide bar track. In this way the slide bars and their associated mechanism are supported by the slide bar tracks 13 and the rail 4 in perfect alignment. It is preferable that the individual bed-plates 5 be separated as at 14 for a purpose which will be more fully described hereinafter. A flexible belt 15 of substantial thickness overlies the individual bed-plates, bridging the gap between them and serves as the bottom of the mold cavity to which the slabs are to be cast.

Mold heads 16 are mounted for sliding movement on the slide bars 6 and are provided at their lower portions with rollers 17 engageable with suitable cam guides 18 arranged to cause sliding movement of the mold heads on the slide bars toward each other into the molding position and other cam guides 19 to reversely move the mold heads into slab releasing position. The mold heads 16 are provided with elements 20 having tongues 21 and grooves 22, corresponding with grooves and tongues on the metal edge elements of the slabs. It is preferable that these elements 20 be slightly beveled as at 23 so that as the mold head assembly is moved toward the belt, the elements 20 will ride up over the edge of the belt and form a firm seat on the belt.

As shown in Figs. 10 and 11, the elements 20 are arranged in closely abutting relation so that when the metal edge members of the slabs are placed thereagainst, such members will be supported thereby substantially throughout their length.

The drive sprocket is shown in Fig. 6 at 24, mounted upon shaft 25 driven by any suitable mechanism, not shown. The shaft 25 likewise carries a beveled gear 26 serving to drive shaft 27 connected at the opposite end with gears 28 and 29. This gear chain causes rotation of the shaft 30 at the in-put end of the machine and likewise sprocket 31.

At the take-off end of the machine and as shown in Fig. 6, it is desirable that the belt 15 maintain its horizontal run until the slabs have been removed therefrom because while these slabs have taken a first set, yet their strength is not such as will enable them to be handled at this point. The slabs must therefore, continue to a point beyond the sprocket 24, while the bed-plates supporting the belt, leave the belt, pass around the sprocket, and to be returned to the in-put end.

As shown in Fig. 6, the rollers 8 on the links 7 drop off of the end of their supporting rail 4, and due to the fact that a space 14 exists between bed-plates, each bed-plate drops down slightly below the level it occupied when the chain roller 8 was supported on the rail 4 as that chain and plate passes around the plate and sprocket 24. This lowered position is indicated in Fig. 6 by the letter A. At this point the plate A drops away from the belt but the slab is still supported by the belt by reason of the fact that it bridges the gap between the last rail supported plate B and the intermediate supporting rollers 32. The horizontal location of the slab therefore, has not been disturbed. This dropping away of the plate A from the belt 15 is sufficient to permit the tipped-up corner 33 of the plate to clear the belt as the plate passes around the sprocket 24.

As shown in Fig. 4, the supporting roller 32 is one of a series used to carry the belt until the end of the slab is received by the take-off belt mechanism 34 driven by means of suitable mechanism at a speed greater than the belt 15. When the end of the finished slab reaches the belt 34, it is separated from its neighbor and carried away therefrom for further disposition such as drying or subsequent treatment. The main belt 15 passes around the drum 35 in an endless manner to the in-put end.

At the in-put end of the machine and as shown in Figs. 1 and 2, the bed-plates 5 pass around the sprocket 31, the mold heads 16 having been returned to molding position by means of the cam guides, the roller 8 of the chain being received on the rail 4 and the rollers 10 and 12 on the slide bar 6 by their tracks 11 and 13. At this point the belt 15 having passed over the drum 36, and under idlers 37, rests upon the top of the bed-plates and in molding position, as shown in Figs. 5 and 7.

The above operations are repeated ad infinitum.

In casting slabs on the above mechanism, and beginning with the mechanism in the position shown in Fig. 2, somewhere around the idler sprocket 31 and the filling mechanisms shown generally at 38, the side metal edge members 39 are placed in position against the elements 20. Where a slab as shown at 40 in Fig. 9 is to be formed with end metal members 41, in addition to the side edge members 39, two of these end members 41 are placed together with the tongue in one fitting the groove in the other and extending between members 20 carried by the mold heads 16. Each therefore holds the other in place. The thus assembled metal edges form with the belt 15 a mold cavity and this cavity passes beneath the filling mechanism 38 where gypsum or other cementitious material of the desired consistency is delivered thereto. As the entire assembly passes along, screeding mechanism 42 of any suitable type levels the cementitious material preferably to the top of the metal elements 39 and the thus cast slab continues along the horizontal run for a desired distance until a first set has taken place. After this has taken place, the rollers 17 on the mold heads engage their cam guides 19 which separate the heads away from the cast slabs and the slab is then removed at the out-put end of the machine as above described.

In some instances, however, it has been found desirable to cast slabs having metal edge members but without end members. In such circumstances it is necessary to provide end gates between slabs preferably so shaped as to form a step or shiplap on the slab ends. This mechanism is shown in some detail in Figs. 12 to 16 inclusive.

For this purpose certain of the elements 20 on certain of the mold heads 16 are removed. The faces of the mold heads 16 are provided with slots 43 through which pass bolts or the like 44 into blocks 45 having vertically extending ribs or projections 46 receivable in corresponding grooves in the end gate 47. Each end of the end gate 47 may be similarly formed and is adapted for engagement with its mating block 45. In this manner, the end gates may be readily removed from their retaining blocks 45 following the separation of the finished slab upon its reaching the belt 34 as has already been described.

Referring now particularly to Fig. 15, these block portions 48 may be cast integrally with their respective gate sections 47'. In the construction illustrated in this figure it will be noted that the end gate 47 is formed in two sections 47' and the adjacent ends of the sections adapted to be firmly held together in their retracted position by means of dowel pins.

The end gate 47 proper is provided with upper and lower projections 49 and 50 respectively, so as to form on the finished slabs, steps or shiplaps.

The position of the end gates 47 will be determined by the length of slabs being cast and this position may be varied by reason of the slots 43 in the mold heads 16. As shown in Fig. 12, the metal edge members 39 extend beyond the mold head elements 20 and the tongue on one of the edge members 39 is seated in a depression 51 of the block 45. The depression 51, as shown on the block illustrated in Fig. 16, is continuous, which makes this member usable on either side of the machine. The assembly being in the position as shown in Fig. 12, the slabs are cast as before, the end gate 47 serving to separate the individual masses of cast material which form the slab and also serving to suitably shape the ends of the slabs. When the entire mechanism approaches the take-off end, the mold heads 16 are separated as above described, the mold head on the right of Fig. 12 carrying the gate 47 proper and the parts are then returned into assembled position beneath the machine as the mechanism returns to the in-put end.

In some instances it has been found desirable to make up metal edged slabs using the metal edge members secured together as a rigid frame, that is, where the frame is assembled first into a rigid structure and this rigid structure placed upon the belt rather than in the form of loose pieces as above described. Obviously any suitable means may be resorted to for fastening these metal elements together.

In the case of such rigid frames, the mold head and slide bar assembly may be entirely dispensed with. In this connection reference is made to Figs. 17, 18 and 19. There the bed-plates are shown at 52 in slightly modified form and to the bottom of which is secured fixture 53, carrying rollers 54, supported on tracks 55. This assembly may be duplicated on the other side of bed-plate to adequately support the same. The flexible belt 15 is used as before.

Attached to the bed-plate 52 is a securing mechanism which includes a lever arm 56 having a bell crank 57 connected with a second lever arm 58 as by toggle 59. The other end of the lever arm 56 terminates in a nose 60 adapted in operative position (see lower half of Fig. 17) to engage with the upper surface of the tongue of the metal edge member 39, the outer edge of the tongue engaging the vertical step 60', (Fig. 19) thus acting as a gauge to accurately position the side member.

Somewhat similar mechanism on the other side of the machine operates in substantially the same manner, the nose 61 carrying gauge means 61' engaging in the groove of, and against a vertical portion of the metal member 39, all of which serves to effectively clamp or secure the frame to the belt 15 in an accurate manner while the plastic material is being poured.

Figure 17:
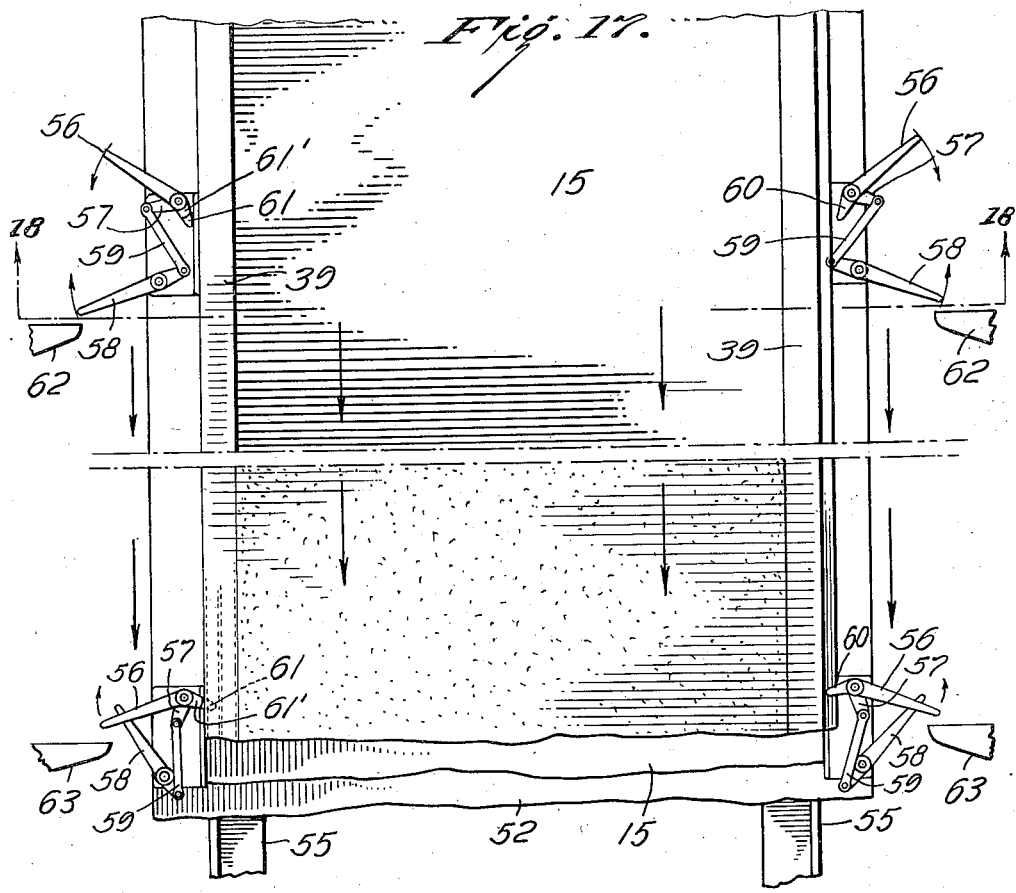
Fig. 17 is a plan view of a modified form of machine, showing the locking means for the edge members.

In order to make the mechanism automatic, a stationary operating trigger 62 is suitably mounted at the side of the machine so that when the bed-plate and its associated mechanism is moving in the direction of the arrows in Fig. 17, the secondary lever 58 will strike the operating trigger 62 and be moved counter-clockwise (looking at Fig. 17). This movement by reason of the top of 59 will cause the nose 60 of the lever arm 56 to engage over the tongue of the mmber 39 and force the latter into contact with the flexible belt. After the material has been poured and has taken its set, a second trigger 63 located on the side of the machine and in a plane higher than that of trigger 62, hits the end of the lever arm 56 and returns it to its initial position, thereby releasing the nose 60 from the tongue on edge member 39. Obviously these securing mechanisms may either be located on each individual bed-plate or only on certain bed-plates, it being only necessary that enough of them be used, depending upon the length of the slab being cast, to secure the frame to the belt.

Figure 18:
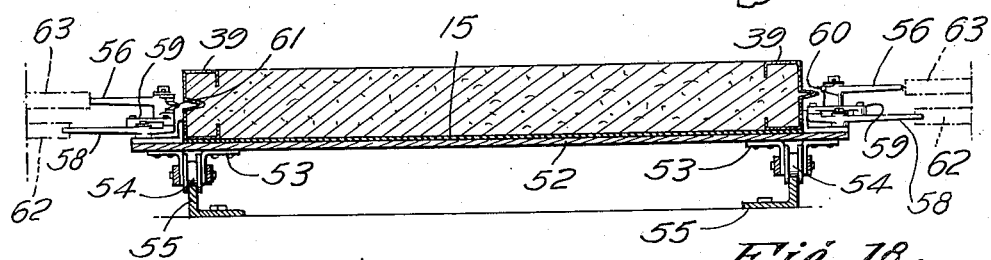
Fig. 18 is a sectional view along the line 18—18 of Fig. 17.
Figure 19:
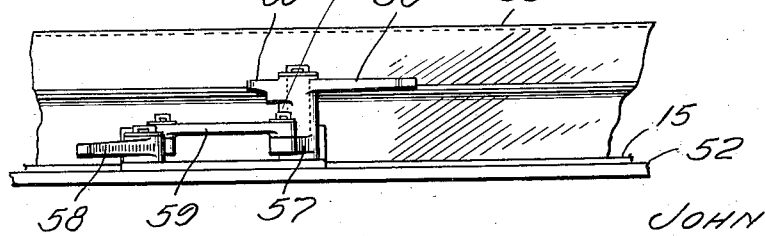
Fig. 19 is a fragmentary side view of the locking mechanism of Figs. 17 and 18.

While the modified mechanism as described in Figs. 17, 18 and 19 is particularly suitable for use with rigid slab frames, yet obviously it is not to be limited thereto, inasmuch as slabs may be formed using this mechanism where loose separated side metal edges are provided. In such case it is to be noted that a gauge plate is likewise secured to the edge of the bed-plates 52 having a vertical portion so spaced with relation to a similar plate at the other side of the run that when the metal members 39 are placed in contact therewith, the desired width of slab may be cast therebetween.

While the invention has been shown and described with reference to particular embodiments of the invention, yet obviously I do not wish to be limited thereto but the invention is to be construed broadly and limited by the scope of the claims.

I claim:

1. A slab molding machine comprising a series of bed-plates, each secured to a bar, a carriage at each end of the bar, tracks for the carriage, a link secured to the bar, a track for the link, mold heads slidingly carried by the bar, a flexible belt overlying the bed-plates, and means to uniformly move the link and belt.

2. The device of claim 1 in which the belt underlies the mold heads.

3. The device of claim 1 with slab side forming metal elements engaged by the mold heads, said belt underlying the metal elements.

4. The device of claim 1 in which each bed-plate is out of contact with its neighbor, the belt bridging the gap between bed-plates.

5. The device of claim 1 with slab side forming metal members, said mold heads engaging said metal members.

6. The device of claim 1 with slab side forming metal members, said mold heads engaging said metal members, said side metal members extending over more than one bed-plate.

7. The device of claim 1 with slab side forming metal members, said mold heads engaging said metal members, said side metal members and said mold heads being complementarily tongued and grooved.

8. The device of claim 1 with an end gate extending between certain mold heads.

9. The device of claim 1 with slab side forming metal members, said mold heads engaging said metal members, and slab end forming metal members extending between certain opposite mold heads.

10. The device of claim 1 with slab side forming metal members, said mold heads engaging said metal members, and slab end forming metal members extending between certain opposite mold heads, said end metal members being tongued and grooved together.

11. A slab molding machine comprising a series of bed-plates, a flexible belt overlying the bed-plates, means for moving the belt and bed-plates uniformly, slab side forming metal members associated with the belt, and means to anchor said metal members in contact with said belt.

12. The device of claim 11 in which the anchoring means comprises a cam and automatic means for operating the same and retuning it to its initial position.

13. The device of claim 11 in which the anchoring means comprises cam mechanism carried by the bed-plates and stationary means located on the machine frame for cooperating therewith to move the same into metal member engaging position and released position.

JOHN G. BRUSH.